United States Patent [19]

Hausauer et al.

[11] Patent Number: 5,790,870

[45] Date of Patent: Aug. 4, 1998

[54] BUS ERROR HANDLER FOR PERR# AND SERR# ON DUAL PCI BUS SYSTEM

[75] Inventors: Brian S. Hausauer; Bassam N. Elkhoury, both of Spring, Tex.

[73] Assignee: Compaq Computer Corporation, Houston, Tex.

[21] Appl. No.: 573,030

[22] Filed: Dec. 15, 1995

[51] Int. Cl.⁶ .................................................. G06F 13/24
[52] U.S. Cl. ................................. 395/733; 395/308
[58] Field of Search ............................. 395/733, 308, 395/309, 800.4, 591, 737; 358/437

[56] References Cited

U.S. PATENT DOCUMENTS

| | | | |
|---|---|---|---|
| 4,639,917 | 1/1987 | Furuta | 395/183.21 |
| 4,760,516 | 7/1988 | Zwick | 395/733 |
| 5,177,747 | 1/1993 | Capps, Jr. et al. | 371/51.1 |
| 5,475,846 | 12/1995 | Moore | 395/733 |
| 5,608,884 | 3/1997 | Potter | 395/309 |
| 5,632,021 | 5/1997 | Jennings et al. | 395/309 |
| 5,649,127 | 7/1997 | Hang | 395/307 |

OTHER PUBLICATIONS

PCI Local Bus Specification Revision 21 Jun. 1, 1995.
PCI Local Bus Specification, Production Version, Revision 2.0, (Apr. 30, 1993) ©1992, 1993 PCI Special Interest Group.

*Primary Examiner*—Ayaz R. Sheikh
*Assistant Examiner*—Paul R. Myers
*Attorney, Agent, or Firm*—Pravel, Hewitt, Kimball & Krieger

[57] ABSTRACT

An apparatus for handling bus error signals is provided for a computer having a processor, an interrupt controller, a first PCI bus with first PERR# and SERR# signals, and a second PCI bus with second PERR# and SERR# signals. The apparatus has a buffer with an input connected to ground, an enable input connected to the second SERR# signal, and an output connected to the first SERR# signal. When the second SERR# signal is asserted, the first SERR# signal is also asserted via the buffer and is provided to one input of the interrupt controller. In an alternate embodiment, the buffer enable input is connected to the first SERR# signal and the buffer output connected to the second SERR# signal. The apparatus also receives the first and second PERR# signals and logically ORs the signals together to generate a combined PERR# signal. The combined PERR# signal is presented to a register which is clocked by the PCI system clock to synchronize the combined PERR# signal to the PCI clock before presenting the PERR# signal to a second input of the interrupt controller. The interrupt controller generates an interrupt to the processor and causes the processor to poll devices to identify the board that might have caused the error and to take a corrective action.

26 Claims, 4 Drawing Sheets

BUS ERROR HANDLER FOR PERR# AND SERR# ON DUAL PCI BUS SYSTEM

BACKGROUND OF THE INVENTION

1. Field of the Invention

The present invention relates in general to an apparatus for handling errors generated by peripherals located on multiple expansion buses, and more specifically, to an apparatus for handling errors generated by peripherals located on multiple PCI buses.

2. Description of the Related Art

Over the past ten years, remarkable increases in hardware price/performance ratios have caused a startling shift in both technical and office computing environments. Distributed workstation-server networks are displacing once pervasive terminals which used to be attached to mainframes and minicomputers. In a computer network, each individual user's workstation is referred to as a client computer, while the machine that provides shared resources such as printers, file storage and communication services is referred to as a file server, or simply server. The server is connected to a local area network (LAN) which is connected to the client computers. Client and server computers are all considered nodes in the network. Client nodes use standard communications protocols to exchange service requests and responses with server nodes. The server has a mass storage device, typically a magnetic hard disk, that is connected to a network and utilized as a central resource for supporting multiple users over the network. The information typically stored on such a system consists of binary computer data such as executable programs and corresponding data.

The rise in client workstation performance by more than a factor of ten in the last few years has enabled more powerful application software to be used with corresponding ravenous appetite for data from the LAN. Further, client computers running multi-tasking operating systems such as UNIX, Windows 95, or Windows NT are capable of sending multiple requests concurrently to the server. As such, the performance requirement on the host server becomes significant.

One solution to solving the server bottleneck deploys a plurality of high speed processors in the server. Each processor is typically an advanced 32-bit processor such as a Pentium™ or a Pentium Pro™ microprocessor available from Intel Corporation of Santa Clara, Calif. To complement the fast processors, fast memory system, disk system, and input/output (I/O) cards are needed. High end servers typically offer one or more Peripheral Component Interconnect (PCI) expansion buses for accepting add-on I/O cards for the I/O hungry server computer. The PCI bus is a relatively fast physical interconnect apparatus intended for use between peripheral controller components and processor/memory systems. In addition to offering higher bandwidth, the PCI bus also provides specific error detection and reporting capabilities for server systems via error reporting pins such as PERRY and SERR#. PERR# is a parity error signal for reporting data parity errors during all PCI transactions except PCI special cycles, while SERR# is provided for reporting address parity errors, data parity errors on special cycle commands, or any other system errors where the result may be catastrophic. PERR# and SERR# thus provide vital feedback data to the processor with respect to the system health and are monitored by the processor to provide a reliable computer system. The # at the end of a signal name indicates that the active state occurs when the signal is at a low voltage. A more detailed description of the structure/operation of the PCI bus architecture and associated provisions for handling errors is provided in "Peripheral Component Interconnect (PCI) Local Bus Specification, Revision 2.1 Production Version," published Jun. 1, 1995; "Preliminary PCI System Designs Guide" Revision 1.0, published Sep. 8, 1993; and "Peripheral Component Interconnect (PCI) Add-in Board/Connector Addendum," published Feb. 26, 1993; all by the PCI Special Interest Group, the content of which references are incorporated herein by reference as if they were fully set forth.

As an enterprise class server has to handle a wide range of peripherals for diverse applications, the ability to accept a multitude of expansion boards is important. To satisfy the I/O requirement, a number of peripheral devices compatible with the PCI bus architecture may be arranged on the primary PCI bus with no other PCI buses present; or a number of PCI peripheral devices could be attached to the primary PCI bus or to a number of secondary PCI buses through respective PCI bridges which are connected to the primary PCI bus. Each secondary PCI bus could also have a number of additional PCI buses attached through PCI bridges to it and these tertiary PCI buses could have additional PCI buses attached to them in various combinations. Although the use of secondary and tertiary PCI buses increases the total number of slots available on the server, devices plugged on secondary and tertiary PCI buses suffer delays in communicating with the processors on the host bus as they must negotiate with one or more layers of arbitration to ultimately reach the processor. To partially eliminate this problem, multiple peer-to-peer PCI bridges are supported by a new Pentium Pro™ host bus to provide a modular approach to improving I/O performance. This peer-to-peer arrangement eliminates delays incurred by traversing through one or more levels of arbitration present in the hierarchical arrangement, resulting in higher system performance. However, the peer-to-peer PCI bridge arrangement results in disparate sets of PERR# and SERR# signals. As the PERR# and SERR# signals of the secondary PCI bus operate independent of the respective PERR# and SERR# on the primary PCI bus in a peer-to-peer arrangement, errors occurring on the secondary PCI bus may not be handled in a manner consistent with those occurring on the primary PCI bus. The resulting differences may cause applications to behave differently when error conditions are encountered, depending on the position of the slot upon which the PCI expansion card has been inserted. Thus, to ensure that errors on the primary and the secondary PCI buses are handled robustly and consistently, an apparatus is needed for unifying error signals generated by peripherals located in the secondary and the primary buses before presenting the error signals to the processors. Further, an apparatus is needed for isolating the source of the error signals to extinguish the problems.

SUMMARY OF THE INVENTION

An apparatus for handling bus error signals is provided for a computer having a processor, an interrupt controller, and first and second buses which are preferably PCI buses. The first bus has a line for carrying a first type of error signal, preferably a first PERR# error signal, and another line for carrying a second type of error signal, preferably a first SERR# error signal. Similarly, the second bus has a line for carrying the first type of error signal, preferably a second PERR# error signal, and another line for carrying a second SERR# error signal.

The apparatus has a buffer with an input connected to ground, an enable input connected to the second SERR# signal, and an output connected to the first SERR# signal. When the second SERR# signal is asserted, the first SERR# signal is also asserted via the buffer. The output of the first SERR# signal is provided to one input of the interrupt controller which generates a non-maskable interrupt (NMI) signal to the processor.

The apparatus also receives the first and second PERR# signals and logically ORs the signals together to generate a combined PERR# signal. The combined PERR# signal is presented to a register which is clocked by the PCI system clock to synchronize the combined PERR# signal to the PCI clock before presenting the combined PERR# signal to a second input of the interrupt controller. Upon receipt of the combined PERR# signal, the interrupt controller generates another NMI signal to the processor.

Thus, upon receipt of either of the combined SERR# or the PCI clock synchronized PERR#, the interrupt controller generates an interrupt signal, preferably a non-maskable interrupt (NMI) signal, to the processor, causing the processor to execute an interrupt handling routine after completing the current instruction. Upon entry to the interrupt handling routine, the processor reads the interrupt status registers to locate the interrupt error group or groups that generated the interrupt. Next, the processor clears the interrupt enable registers to allow detection of new interrupts. For each group that was associated with the error indication, the processor polls all devices that might have caused the error and takes appropriate corrective actions.

The thus described apparatus unifies error signals generated by peripherals located in the secondary and the primary expansion buses before presenting the error signals to the processors so that errors on both PCI buses are handled robustly and consistently. Hence, a more reliable computer system is provided for applications that require high performance and reliability.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
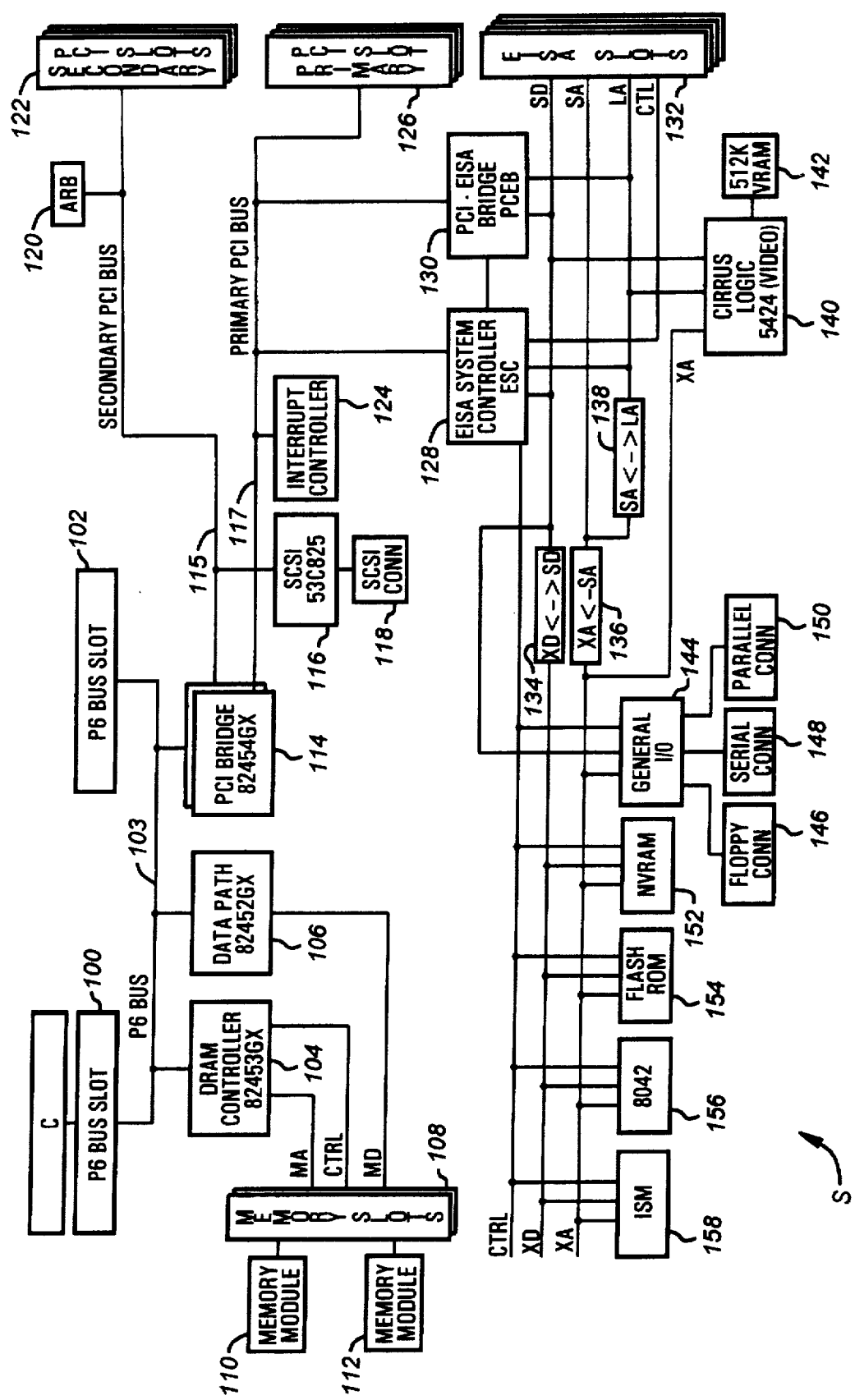
FIG. 1 is a block diagram of a computer system in accordance with the present invention.

Turning now to FIG. 1, a server computer system S is disclosed. To provide sufficient processing capability for enterprise-class server applications, the server computer system S of FIG. 1 deploys one or more processors, preferably the Pentium Pro™ processor available from Intel Corporation located in Santa Clara, Calif. The Pentium Pro™ processors reside on a processor card C which is plugged into one of the P6 slots 100–102. The P6 slots 100–102 are connected to a 72-pin Pentium Pro™ host bus called the P6 bus 103. The P6 bus 103 is a high performance bus which preferably supports two processor cards mounted on slots 100–102. Preferably, each processor card C supports two Pentium Pro™ processors. Thus, the preferred embodiment supports up to four processors.

In addition to the processors, the P6 bus 103 is connected to a memory controller 104 and a data path device 106 which collectively form a DRAM control subsystem. Preferably, the DRAM controller is an 82453GX and the data path device 106 is an 82452GX, both of which are available from Intel Corporation. The DRAM controller 104 provides control and timing to the memory subsystem, while the data path device 106 interfaces the 72-bit P6 host bus to the memory array. The memory controller 104 and the data path 106 are capable of taking a memory request from the CPU, queueing it, and responding after the requested operation has completed. Additionally, the controller 104 provides memory error correction which is vital in server applications, including the capability of single-bit error correction and multi-bit error detection on the fly. Memory arrangements having non-interleaved, x2 and x4 interleaving configurations are supported by the memory controller 104. A plurality of memory modules 110–112 are connected to memory slots 108 to provide up to four gigabytes of memory. The controller 104 minimizes the impact of the idle cycles by allowing read operations to bypass around the write operations and be completed first as long as the memory addresses for the read/write pair do not match. During operation, the actual performance of the memory subsystem will depend in part on the mix of read and write operations and the memory access patterns for a given application.

In addition to the memory controllers, a robust input/output system is needed for the server S. The I/O subsystem designed for the server must be scalable while meeting the performance requirements for the four Pentium Pro™ processors. The PCI bus provides a combination of high performance and scalable I/O for the demanding environment faced in server applications. To provide PCI connections, one or more PCI bridges 114 are connected to the P6 bus 103. The peer-to-peer arrangement of the PCI bus eliminates one or more levels of arbitration present in the hierarchical arrangement, resulting in higher system performance. Preferably, the PCI bridge 114 is an 82454GX PCI bridge (PB) from Intel which integrates the bus arbitration logic required to connect up to two 82454GX PB components without any external glue logic. In the preferred embodiment, one PCI bridge is configured to be the compatibility PCI bridge by strapping options at power-up. This PCI bridge provides the PC compatible path to the boot ROM and the EISA/ISA bus. A second PCI bridge, called an auxiliary bridge, is configured by strapping options to be the auxiliary PCI bridge. An arbiter 120 is connected to the secondary PCI bus 115 to arbitrate accesses to and from the secondary PCI bus 115. The arbitration for the processor bus is controlled by the compatibility bridge, which will have a higher priority than the auxiliary bridge to ensure a proper response time for ISA bus masters. The plurality of PCI bridges 114 provides a plurality of PCI buses, which because of their direct connections to the P6 bus 103, provides inherently faster arbitration response than the alternative of cascading PCI bridges together to provide for multiple PCI buses. This ability not only provides for design flexibility, but also for redundant I/O channels for systems in which reliability is paramount.

As in the DRAM controller 104, the PCI bridge 114 supports a full 64-bit interface to the CPU bus, including support for all protocols as well as error correction. The PCI bridge 114 supports an 8-deep transaction in-order queue as well as separate 4-deep queues for both outbound (processor to PCI) and inbound (PCI to processor) transactions that are for the I/O bus agent. Also, like the DRAM controller 104, the PCI bridge 114 provides four 32-byte data buffers in both the inbound and outbound directions. The buffers decouple the host bus 103 from the PCI buses 115–117 and optimize performance by allowing the posting of data at full bus speeds in both directions. However, unlike the DRAM controller 104, the PCI bridge 114 supports up to two outstanding deferred-reply requests. This feature allows a bus transaction to be split and completed later, preventing the Pentium Pro™ P6 bus 103 from becoming blocked by long latency I/O operations. In this mode, the PCI bridge 114 would defer Pentium Pro™ memory reads, I/O reads, I/O writes, and interrupt acknowledge transactions. However, memory write transactions are not deferred since they are better optimized through posting.

Attached to the secondary PCI bus 115 is a SCSI disk controller 116. The SCSI controller 116 provides the capability of handling simultaneous disk commands which is necessary in a multi-threaded, multi-tasking operating system. Preferably, the SCSI controller 116 is a 53C825 available from NCR Corporation. Attached to the 53C825 are a plurality of SCSI connectors 118 which drive a plurality of disk drives adapted to support the host system's simultaneous issuance of multiple commands to one or more SCSI devices. The ability to overlap commands and queue the commands to one or more devices can significantly boost performance in environments such as Windows 95 and NT. In addition to the SCSI controller 116, a plurality of devices may be plugged into the secondary PCI bus 115 over a plurality of secondary PCI slots 122.

On the primary PCI bus 117, an interrupt controller 124 handles interrupt requests coming into the PCI bridge 114 for eventual transmission to one of the processors in slots 100–102. The interrupt controller 124 routes interrupt requests from devices located on PCI buses 115–117 to the processors on slots 100–102 during multiprocessor operation. Additionally, a number of PCI peripherals may be plugged into a plurality of primary PCI slots 126. Additionally, an EISA system controller ESC 128, preferably the Intel 82374EB device, and a PCI-EISA bridge PCEB 130, preferably the Intel 82375EB, are connected to the primary PCI bus 117. The ESC 128 and the PCEB 130 must be connected to the primary PCI bus 117, as the auxiliary bus controller must request arbitration from the compatibility bus controller 114 on some operations. That added latency means that the auxiliary bus or secondary PCI bus 115 cannot meet PCI version 2.1 latency specifications, and that EISA and ISA bus bridges have to be on the compatibility bus or primary PCI bus 117.

The ESC 128 and the PCEB 130 work in tandem to provide an EISA I/O subsystem interface for the computer system S. The combination of the ESC 128 and the PCEB 130 provides an I/O subsystem capable of taking advantage of the power of the PCI bus architecture while maintaining access to a large base of EISA and ISA expansion cards, and the corresponding software applications. With the inclusion of the ESC 128 and the PCEB 130, the system S now contains three levels of buses structured in the following hierarchy: P6 bus 103 as the execution bus; an expansion bus system having primary and secondary PCI buses 115–117; and an EISA bus as another I/O bus. This bus hierarchy allows concurrency for simultaneous operation on all three bus environments. Data buffering permits concurrency for operations that cross over into another bus environment. The ESC 128 implements system functions such as timer/counter, DMA, interrupt controller, and EISA subsystem control functions such as EISA bus controller and EISA bus arbiter. The PCEB 130 provides the interface to the bridge between the PCI and EISA buses by translating bus protocols in both directions. It uses extensive buffering on both the PCI and EISA interfaces to allow concurrent bus operations.

The ESC 128 and the PCEB 130 are connected to a plurality of EISA slots 132. Additionally, the ESC 128 also generates chip selects for certain functions that typically reside on an X bus. The ESC 128 generates chip select signals from an integrated system management unit (ISM) 158, a keyboard controller 156, a flash ROM 154, a non-volatile RAM 152, and a general purpose I/O device 144 which supports floppy drives, serial ports, and parallel ports over floppy connectors 146, serial connectors 148, and parallel connectors 150. The EISA slots 132 have system data lines connected to the data bus of the X bus via a buffer 134 which provides accesses to I/O devices as well as the system BIOS in the flash ROM 154. Further, the EISA slots 132 have system address lines that are connected to the address lines of the X bus via buffer 136. The EISA slots 132 have latched address lines which are connected to the system address lines via buffer 138. Finally, a video controller 140 is connected to the X bus address lines, the EISA/132 system data lines, and the latched address lines. Preferably, the video controller is a Cirrus Logic 5424 controller. The video controller 140 is connected to a video RAM 142 which is preferably 512 kilobytes in size.

Figure 2:
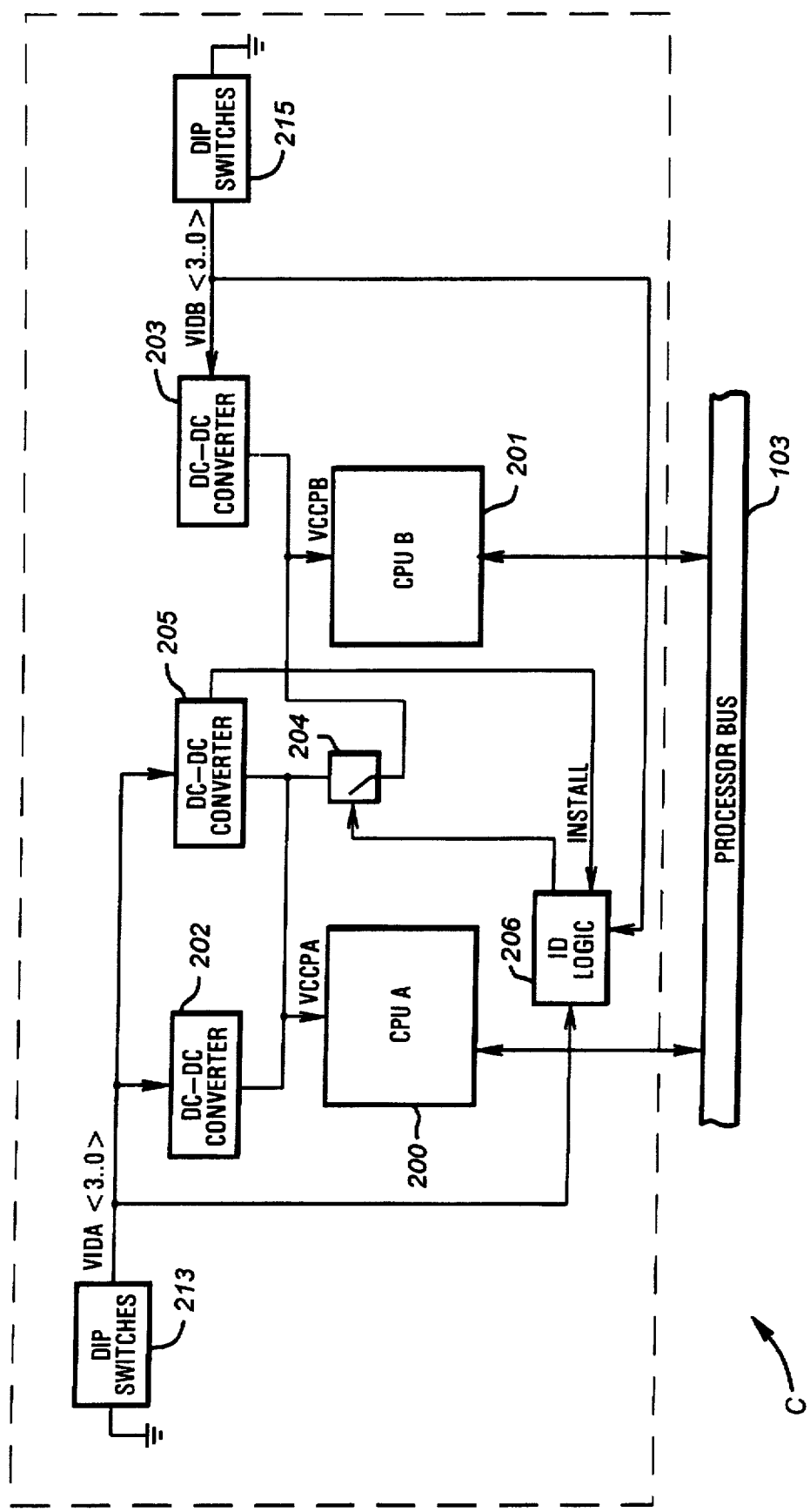
FIG. 2 is a block diagram of a processor circuit board of the computer system of FIG. 1.

Turning to FIG. 2, more detail is provided on the processor card C which can be inserted into either slot 100 or slot 102. In FIG. 2, the processor card C has a first CPU 200 and a second CPU 201. The CPU 200 is powered by a DC-DC converter 202, while the CPU 201 is powered by a DC-DC converter 203. The voltage generated by the DC-DC converter 202 is specified via a plurality of DIP switches 213. Similarly, a plurality of DIP switches 215 specifies the voltage to be generated by the DC-DC converter 203. The DC-DC converters 202–203 provide power to the respective CPUs 200–201. Additionally, a redundant DC-DC converter 205 is available. The output voltage on the DC-DC converter 205 is also specified by DIP switches 213. In one mode of operation where the CPU 200 is the primary CPU, the DC converters 202 and 205 provide power to the CPU 200, while the DC-DC converter 203 solely powers the CPU 201. In the event that DIP switches 213 and 215 are equal in value, the DC-DC converter 205 can be set up so that it powers both CPUs 200–201. This comparison is provided by an ID logic 206 which receives inputs from DIP switches 213–215 and receives an install signal from the DC-DC converter 205. Thus, in the event that the setting of DIP switches 213–215 is equal and the DC-DC converter 205 is installed, the DC-DC converter 205 provides power to both CPUs 200–201. The CPUs 200–201 are eventually connected to the processor bus 103 to access memory and to provide the results of the processing to the rest of the server computer S. Although the preferred embodiment uses DIP switches 213 and 215, it is known by those skilled in the art to have the CPUs 200–201 generate and present the voltage request signals directly to the DC-DC converters 202, 203 and 205 in place of the DIP switches 213 and 215.

Each of CPUs 200–201 can operate in parallel for applications that can take advantage of parallel processing. In addition to being able to operate in parallel, the dual processors on the processor card C can operate in a functional redundancy check (FRC) mode to provide an additional reliability check. The FRC mode configuration consists of one master CPU and one slave or checker CPU. The two CPUs are connected as one logical unit. The master runs code and produces results. Meanwhile, the slave runs the same code and compares its results with the master's results. If there is any disagreement, an error is registered. The two CPUs 200–201 are maintained in lock-step by synchronizing all of their inputs to the clock of the CPU board. In the preferred embodiment, the Pentium Pro™ provides the FRC mode logic. All of the inputs and most of the outputs of the FRC pair 200–201 are tied directly together. One processor is configured as master or checker during system reset. The processor configured as the master behaves as a normal processor. The processor configured as the checker never drives its outputs, but compares them to the outputs of its master. If a discrepancy arises, the checker signals the master by asserting FRCERR for one clock cycle. After the assertion of FRCERR, the checker stops further checking and its internal state is undefined. Upon receiving FRCERR, the master FRC CPU jumps to an appropriate error handling routine so that it can robustly recover from the error.

In a server system such as that of computer system S, reliability is important. Errors that are encountered need to be handled robustly so that the system remains operational and available. Thus, in addition to providing a robust error recovery for the processors via the FRC capability, the computer system S also provides a robust error recovery for faults generated by I/O cards on PCI buses 115 and 117. The PCI standard provides PERR# and SERR# for parity and system errors to be detected and reported separately on each PCI bus. The PCI error handling is provided to agents that detect, report, and recover from errors. The parity reporting capability of the PCI architecture provides a mechanism to determine transaction-by-transaction if the master is successful in addressing the desired target and if data being transferred between them occurs correctly. Only the master of corrupted bus transfers reports parity errors to software using mechanisms other than PERR#. This gives the originator of the access, at each level in software, the prerogative of recovery. A master of an access that detects a parity error can continue the transaction or terminate it. Similarly, the target of an access that detects a parity error can either continue the operation or cause it to be stopped via target termination. When the master of an access becomes aware that a parity error has occurred on its transaction, it is required to inform the processor. The recommended route is for the master to inform its device driver of the error by generating an interrupt, among other options.

If none of these options is available to the device, it may as a last recourse, pass responsibility of handling the error to the operating system by asserting SERR#, which is a PCI pin used to indicate errors other than parity errors. When a PCI agent, which can be a PCI master or a slave device, asserts SERR#, it is required to set the signalled system error bit in the PCI's configuration space status register. The end agent interested in SERR# is the central resource that converts the low going SERR# pulse into a signal to the processor, preferably a non-maskable interrupt (NMI) signal, among other methods. Typically, an agent may assert SERR# upon the detection of a parity error that is not reported by some other mechanisms; upon the abnormal termination of a transaction; or upon a catastrophic error that leaves the agent questioning its ability to operate correctly. Thus, the assertion of SERR# is performed only as a last recourse in handling errors.

As can be seen, SERR# and PERR# provide support for a robust error handling mechanism which contributes to a reliable server system. However, in a peer-to-peer multiple PCI bus system, SERR# and PERR# of the secondary PCI bus is isolated from the SERR# and PERR# of the primary PCI bus. As such, the errors generated by the secondary PCI devices located on the secondary PCI slots are not handled in a manner consistent with the errors generated by the primary PCI peripherals located on the primary PCI slots 126. This problem is resolved by the circuit of FIG. 3.

Figure 3:
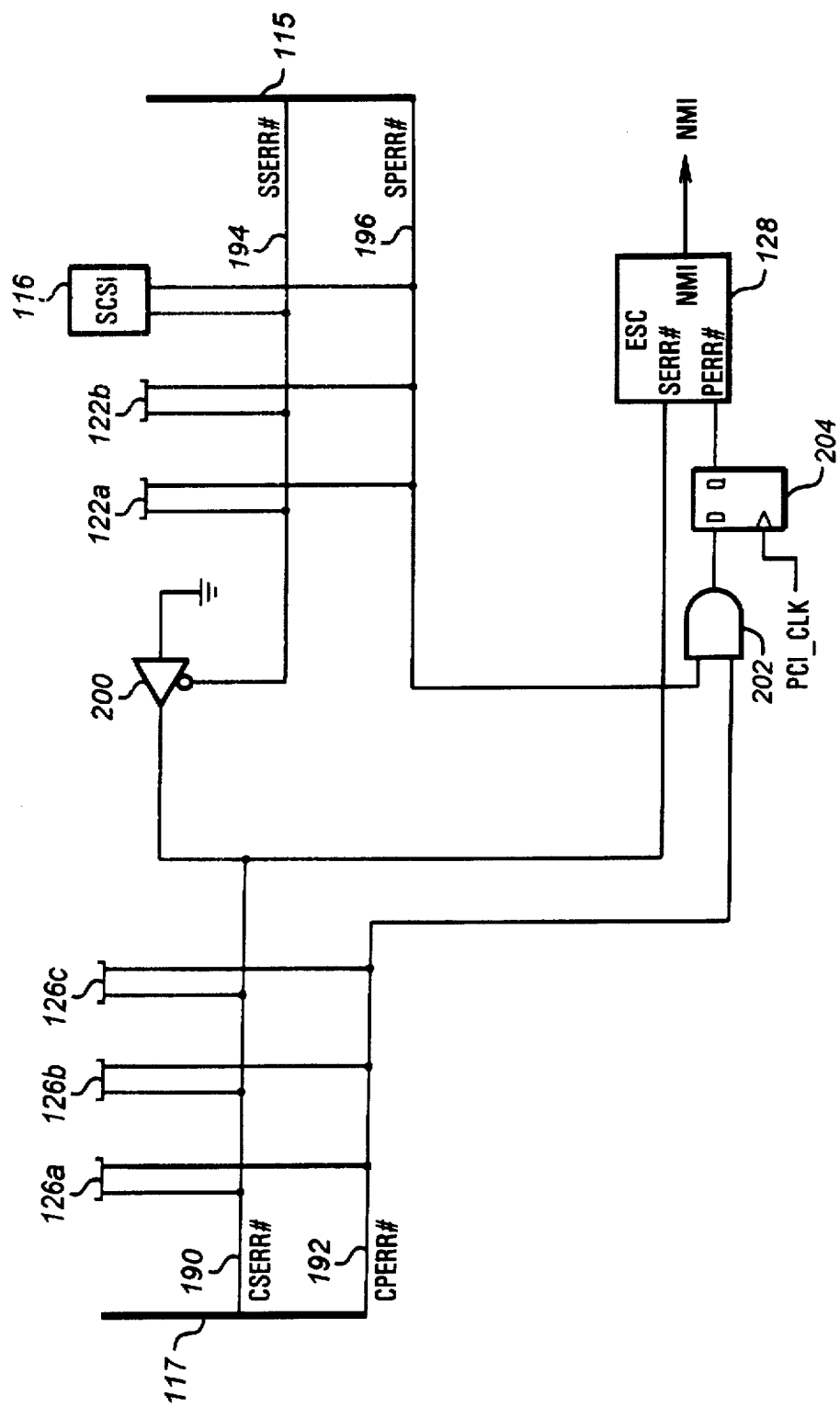
FIG. 3 is a schematic of the apparatus for handling bus errors of the present invention.

Turning to FIG. 3, a plurality of primary PCI slots 126A, 126B, and 126C are connected to the PCI bus 117. One or more PCI-compatible I/O cards (not shown) are inserted into slots 126A–126C. Each of slots 126A–126C has one signal connected to a CSERR# line 190 which is the primary channel SERR#. Further, each of the primary PCI slots 126A–126C has a signal connected to CPERR# line 192 which is the primary channel PERR*. Similarly, on the secondary PCI bus 115, each secondary PCI slot 122A and 122B has signals that are connected to a SSERR# line 194 and a SPERR# line 196 of the secondary PCI bus 115, respectively. Further, the SCSI interface device 116 has an output signal connected to the SSERR# line 194 and another output signal connected to the SPERR# line 196 of the secondary PCI bus 115.

Although the preferred embodiment transmits the system error signal SSERR# 194 from the secondary PCI bus 115 to the CSERR# 190 on the primary PCI bus 117, one skilled in the art can substitute the role of the first and second PCI buses by reversing the connections so that the system error signal CSERR# 190 from the primary PCI bus 117 is transmitted to the secondary PCI bus 115. In such a system, the CSERR# signal 190 is connected to the enable input of the tristate buffer 200, while the input of the buffer 200 is connected to ground and the output of the buffer 200 is connected to the SSERR# signal 194 of the secondary PCI bus 115. As such, system errors generated on the primary PCI bus 117 are communicated to the system error input pin SSERR# 194 of the secondary PCI bus 115 for eventual notification to the ESC 128.

The circuit to handle system error signals is discussed next. In FIG. 3, the SSERR# line 194 of the secondary PCI bus 115 and the CSERR# line 190 of the primary PCI bus 117 are coupled to each other via a tristate buffer 200. The tristate buffer 200 has an output enable line connected to the SSERR# line 194. The input of the tristate buffer 200 is connected to ground, while the output of the tristate buffer 200 is connected to the CSERR# line 190. Thus, when the SSERR# line 194 is asserted, an asynchronous assertion of the CSERR# line 190 is generated via the tristate buffer 200. The CSERR# line 190 is presented to the SERR# input of the ESC 128. Upon sampling the SERR# input active, the ESC 128 generates an NMI interrupt to the processors 200–201.

Turning to the handling of parity error signals on buses 115 and 117, a SPERR# line 196 from the secondary PCI bus 115 is provided to one input of an AND gate 202. A CPERR# line 192 carrying the PERR# signal for the primary PCI bus 117 is provided to the other input of the AND gate 202. The output of the AND gate 202 is provided to the D input of a flip-flop 204. The flip-flop 204 is clocked by PCI_CLK, the clock signal of the primary PCI bus 117. The output of the flip-flop 204 is provided to the PERR# input of the ESC 128 which causes the ESC 128 to generate an interrupt to the processors located on card C. Thus, the PERR# input is generated by logically ORing and then synchronizing the PERR# signals from the primary and the secondary PCI buses 115 and 117 with PCI_CLK. The thus connected PERR# signals from either PCI bus are received by the ESC 128 on the rising edge of PCI_CLK. Upon sampling PERR# active, the ESC 128 generates an NMI interrupt to the CPU.

The error handler of FIG. 3 thus consolidates SERR# and PERR# signals from separate PCI buses 115 and 117, combines them, and routes them through the ESC 128. This routing allows an operating system to handle multiple NMIs even if the source of the NMI is located on different PCI buses.

Upon the receipt of the NMI interrupt at the NMI pin of the processor, the processor finishes the current instruction and immediately initiates an interrupt cycle. An NMI generally arises as a result of a serious hardware problem and is different from a standard interrupt in that it cannot be suppressed or masked in the processor, as the name suggests. As numerous interrupts may be generated at once, the software in the operating system must handle the NMI requests in a specific sequence to prevent losing interrupt requests.

Figure 4:
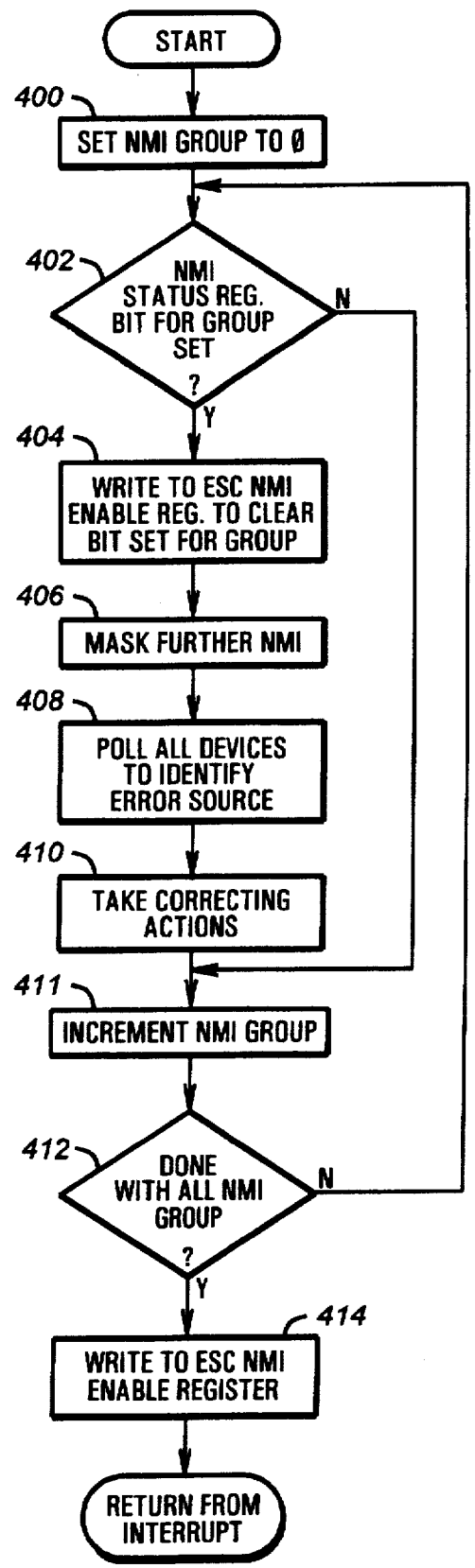
FIG. 4 is a flow diagram of an NMI interrupt handler routine which responds to the interrupt signals generated by the circuit of FIG. 3.

Turning to FIG. 4, the NMI handling sequence is disclosed. After completing the current instruction, the processor jumps to the start of the software in FIG. 4. At this point, the processor needs to isolate the specific device generating the NMI error from six groups. The NMI error groups, along with the respective addresses for the NMI status register and the NMI enable register for the preferred embodiment of the computer system S are as follows:

| NMI Error Group | NMI Status Register | NMI Enable Register |
| --- | --- | --- |
| Motherboard parity error (PERR#) | port 61h, bit 7 | port 61h, bit 2 |
| Add-in borad parity errors (IOCHK#) | port 61h, bit 6 | port 61h, bit 3 |
| Fail safe timer timeout | port 461h, bit 7 | port 461h, bit 2 |
| EISA bus timeout | port 461h, bit 6 | port 461h, bit 3 |
| Software generated NMI | port 461h, bit 5 | port 461h, bit 1 |
| System error (SERR#) | N/A, detect through process of elimination | ESC config register, offset 40h, bit 3 |

In step 400, the routine sets the NMI group to group 0 to initiate a systematic search for all six groups. In step 402, the NMI status register of the ESC 128 is checked to see if the corresponding NMI error group has been set. In the case of the SERR# group, no individual bit is available, so each potential source must be checked individually. If the error bit of the group is not set in step 402, the routine jumps to step 411 which increments the NMI group to examine the next group for potential errors. Alternatively, if in step 402 an error bit is set, then the processor writes to the ESC 128 NMI enable register to clear the NMI groups in step 404. This write operation resets the edge detect flip-flop for each group and allows the detection of new NMIs that occur for that particular group. Next, in step 406, the processor may optionally write to the ESC NMI enable register to mask further NMIs from occurring during the execution of the NMI handler. As the reading of status register does not tell which bus the error occurred on, in the case of the PERR# signal or the IOCHK# signal, the software has to search the devices on both PCI buses to locate the source of the error. In step 408, the processor polls each device on the primary and secondary PCI buses 115, 117 that is capable of asserting the error for the particular NMI error group. Next, in step 410, the corrective actions are taken by the processor in the NMI handler. The corrective action may be as simple as informing the user that an error has occurred, or may be as complex as requiring certain software to be reexecuted and data retransmitted. From step 410, or if no error exists for the current NMI group in step 402, the NMI group index is incremented to point to the next NMI group in step 411. In step 412, if the processor has not checked all NMI groups the routine loops back to step 402 to check the next group set. Alternatively, once the processor has polled all devices from all active error groups, and has taken all appropriate corrective actions, it is ready to return from the interrupt. Before doing so, the processor should briefly disable the NMI and then reenable the NMI by writing to the ESC NMI enable register in step 414. This write operation causes a new edge on the processor's NMI input if any new NMI errors occurred during the processing of the previous errors. Finally, the routine returns from the NMI interrupt call. Although the preferred embodiment uses NMI signals, one skilled in the art would know that other types of interrupts are available to signal error conditions to the processor and enable the processor to institute error recovery procedures.

As discussed above, the present invention unifies error signals generated by peripherals located in the secondary and the primary buses before presenting the error signals to the processors so that errors on the primary and the secondary PCI buses are handled robustly and consistently. Thus, when the second SERR# signal is asserted on the second PCI bus, the first SERR# signal on the first PCI bus is also asserted via the buffer. The output of the first SERR# signal is provided to one input of the interrupt controller which generates an NMI interrupt at the processor. The apparatus of the present invention also receives the first and second PERR# signals from the first and second PCI buses and logically ORs the signals together to generate a combined PERR# signal. The combined PERR# signal is presented to a register which is clocked by the PCI system clock to synchronize the combined PERR# signal to the PCI clock before presenting the PERR# signal to a second input of the system controller. Finally, the processor identifies the interrupt groups and polls expansion boards to locate and handle the source of the error signals. The thus described apparatus unifies error signals before presenting the error signals to the processors so that errors on the primary and the secondary PCI buses are handled robustly and consistently resulting in a more reliable computer system S.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. An apparatus for communicating error signals in a computer having an interrupt input, said apparatus comprising:

a first expansion bus having a first line for carrying a first type of error signal and a second line for carrying a second type of error signal;

a second expansion bus having a third line for carrying the first type of error signal and a fourth line for carrying the second type of error signal;

a buffer to unify said first type of error signal from said third line of said second expansion bus with said first line of said first expansion bus, forming a first output signal representing the occurrence of the first type of error in the computer;

a synchronizing circuit to receive the second type of error signal from the first and second expansion buses, the synchronizing circuit forming a second output signal representing the occurrence of the second type of error in the computer; and an interrupt controller coupled to said interrupt input of said computer, said interrupt controller receiving said first and second output signals from said buffer and said synchronizing circuit, said interrupt controller interrupting said computer upon receipt of either said output signals.

2. The apparatus of claim 1, wherein said first expansion bus is a Peripheral Component Interconnect bus.

3. The apparatus of claim 1, wherein said second expansion bus is a Peripheral Component Interconnect bus.

4. The apparatus of claim 3, wherein said first expansion bus is a Peripheral Component Interconnect bus.

5. The apparatus of claim 1, wherein said first type of error signal includes a system error signal.

6. The apparatus of claim 1, wherein said second type of error signal includes a parity error signal.

7. The apparatus of claim 6, wherein said first type of error signal includes a system error signal.

8. The apparatus of claim 1, wherein said buffer to unify the first type of error signal is a tristate buffer having a data input connected to ground, a control input connected to said third line, and an output connected to said first line of said first expansion bus.

9. The apparatus of claim 1, wherein said first expansion bus has a clock signal, and wherein said synchronizing circuit to receive said second type of error signal has a register, said register receiving said second type of error signal from said fourth line of said second expansion bus and from said second line of said first expansion bus, said register clocked by said clock signal, said register providing an output to said interrupt controller.

10. The apparatus of claim 9, wherein a plurality of devices are plugged into said first and second expansion buses, and further comprising a processor for polling devices located on said expansion buses to identify the source of said first or second type of error signals upon receipt of said NMI signal.

11. The apparatus of claim 1, further comprising an Extended Industry Standard Architecture (EISA) bus having interrupt signals, wherein said interrupt controller is coupled to said EISA bus for handling said EISA interrupt signals.

12. The apparatus of claim 11, further comprising a processor for clearing said NMI signal.

13. The apparatus of claim 1 wherein said interrupt controller interrupts said computer with a non-maskable interrupt (NMI) signal.

14. A computer with an error handling capability, comprising:
a processor having an interrupt input;
a first expansion bus having a first line for carrying a first type of error signal and a second line for carrying a second type of error signal;
a second expansion bus having a third line for carrying the first type of error signal and a fourth line for carrying the second type of error signal;
a buffer to unify said first type of error signal from said third line of said second expansion bus with said first line of said first expansion bus, forming a first output signal representing the occurrence of the first type of error in the computer;
a synchronizing circuit to receive the second type of error signal from the first and second expansion buses, the synchronizing circuit forming a second output signal representing the occurrence of the second type of error in the computer; and
an interrupt controller coupled to said interrupt input of said processor, said interrupt controller receiving said first and second output signals from said buffer and said synchronizing circuit, said interrupt controller interrupting said processor upon receipt of either said output signals.

15. The computer of claim 14, wherein said first expansion bus is a Peripheral Component Interconnect bus.

16. The computer of claim 14, wherein said second expansion bus is a Peripheral Component Interconnect bus.

17. The computer of claim 16, wherein said first expansion bus is a Peripheral Component Interconnect bus.

18. The computer of claim 14, wherein said first type of error signal include a system error signal.

19. The computer of claim 14, wherein said second type of error signal includes a parity error signal.

20. The computer of claim 19, wherein said first type of error signal includes a system error signal.

21. The computer of claim 14, wherein said buffer to unify the first type of error signal is a tristate buffer having a data input connected to ground, a control input connected to said third line, and an output connected to said first line of said first expansion bus.

22. The computer of claim 21, wherein a plurality of devices are plugged into said first and second expansion buses, and wherein said processor further polls devices located on said expansion buses to identify the source of said first or second type of error signals upon receipt of said NMI signal.

23. The computer of claim 14, wherein said first expansion bus has a clock signal, and wherein said synchronizing circuit to receive said second type of error signal has a register, said register receiving said second type of error signal from said fourth line of said second expansion bus and from said second line of said first expansion bus, said register clocked by said clock signal, said register providing an output to said interrupt controller.

24. The computer of claim 23, wherein said processor further clears said NMI signal.

25. The computer of claim 14, further comprising an Extended Industry Standard Architecture (EISA) bus having interrupt signals, wherein said interrupt controller is coupled to said EISA bus for handling said EISA interrupt signals.

26. The computer of claim 14, wherein said interrupt controller interrupts said processor with a non-maskable interrupt (NMI) signal.

* * * * *